(12) United States Patent
Nagai (10) Patent No.: US 8,314,599 B2
(45) Date of Patent: Nov. 20, 2012

(54) DC/DC CONVERTER CONTROL CIRCUIT AND DC/DC CONVERTER CONTROL METHOD

(75) Inventor: Ryuta Nagai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 425 days.

(21) Appl. No.: 12/479,014

(22) Filed: Jun. 5, 2009

(65) Prior Publication Data

US 2009/0302817 A1 Dec. 10, 2009

(30) Foreign Application Priority Data

Jun. 9, 2008 (JP) ................... 2008-150507
Mar. 20, 2009 (JP) ................... 2009-069184

(51) Int. Cl.
*G05F 1/575* (2006.01)
*G05F 1/618* (2006.01)

(52) U.S. Cl. ........................ 323/285; 323/284

(58) Field of Classification Search .................. 323/224, 323/282, 284, 285
See application file for complete search history.

(56) References Cited

U.S. PATENT DOCUMENTS

| | | | |
|---|---|---|---|
| 6,100,675 A | 8/2000 | Sudo | |
| 6,366,070 B1 * | 4/2002 | Cooke et al. | 323/284 |
| 7,239,119 B2 * | 7/2007 | Baurle et al. | 323/284 |
| 7,400,127 B2 * | 7/2008 | Steele | 323/288 |
| 7,443,150 B2 * | 10/2008 | Schiff | 323/282 |
| 7,453,246 B2 * | 11/2008 | Qiu et al. | 323/282 |

FOREIGN PATENT DOCUMENTS

JP 11-155281 A 6/1999

* cited by examiner

*Primary Examiner* — Gary L Laxton

(74) *Attorney, Agent, or Firm* — Arent Fox LLP (57) ABSTRACT

A DC-DC converter has an error amplifier, a first control unit and an oscillator. The error amplifier amplifies an error voltage between an output voltage and a set voltage, the output voltage being outputted from an inductance element by feeding an input voltage to an inductance element in a predetermined cycle. The first control unit controls the output voltage to a set voltage by causing a switching operation of a switch element in response to an output of the error amplifier, the switch element forming a path for input voltage feed to the inductance. The oscillator generates a periodical signal at the time of switching the switch element. The oscillator handles an oscillation cycle as a short cycle in comparison to any prior cycles, in response to a drop in the output voltage from the set voltage by an amount equivalent to a first voltage value or more.

18 Claims, 10 Drawing Sheets

CIRCUIT BLOCK DIAGRAM ACCORDING TO FIRST EMBODIMENT

FIG. 1 CIRCUIT BLOCK DIAGRAM ACCORDING TO FIRST EMBODIMENT

FIG. 2

FIRST CIRCUIT EXAMPLE OF OSCILLATOR ACCORDING TO FIRST EMBODIMENT

FIG. 3  OPERATION WAVEFORM ILLUSTRATING OPERATION OF OSCILLATOR OF FIRST CIRCUIT EXAMPLE

FIG. 4

SECOND CIRCUIT EXAMPLE OF OSCILLATOR ACCORDING TO FIRST EMBODIMENT

FIG. 6

CIRCUIT EXAMPLE OF DELAY CIRCUIT

FIG. 7

OPERATION WAVEFORM ILLUSTRATING OPERATION OF DELAY CIRCUIT

FIG. 8 CIRCUIT BLOCK DIAGRAM ACCORDING TO SECOND EMBODIMENT

FIG. 9 CIRCUIT BLOCK DIAGRAM ACCORDING TO THIRD EMBODIMENT

FIG. 10  OPERATION WAVEFORM ILLUSTRATING OPERATION OF OSCILLATOR OF FIRST CIRCUIT EXAMPLE

DC/DC CONVERTER CONTROL CIRCUIT AND DC/DC CONVERTER CONTROL METHOD

CROSS-REFERENCE TO RELATED APPLICATIONS

This application is based upon and claims the benefit of priority of the prior Japanese Patent Application Nos. 2008-150507 filed on Jun. 9, 2008, and 2009-069184 filed on Mar. 20, 2009, the entire contents of which are incorporated herein by reference.

FIELD

The embodiments discussed herein are related to a DC/DC converter control circuit and a DC/DC converter control method.

BACKGROUND

A switching regulator as discussed in Japanese Laid-Open Patent Publication No. 11-155281 has an error amplifier which receives a reference voltage and an observation voltage obtained by subjecting an output voltage to voltage division and amplifies a difference voltage thereof. An output of the error amplifier is compared with an oscillator signal and then, a switching operation is carried out in a PWM. Oscillation frequency is changed in accordance with the size of the load, allowing for improved efficiency in case of light load.

In Japanese Laid-Open Patent Publication No. 11-155281, while an oscillation frequency of an oscillator signal charges in accordance with the size of a load, this operation corresponds to a steady state. For example, the number of switching operations per unit of time is reduced by reducing the oscillation frequency in the case of a light load, as compared to the case of a heavy load, which reduces power consumption. This configuration improves efficiency. Thus, no fluctuations in the output voltage in a transient state in case of a sudden change in the load are disclosed or suggested.

As illustrated in the Japanese Laid-Open Patent Application No. 11-155281, the DC/DC converter has an error amplifier which amplifies a difference voltage between a reference voltage and an observation voltage and changes a switching duty ratio in response to the amplification result. Thus, the fluctuations in the output voltage are recovered in response to transient fluctuations in the output voltage triggered by sudden changes in the load.

For example, the error amplifier has a circuit for phase compensation which is provided between an input and an output terminal thereof. The phase compensation circuit is made up of a resistive element, a capacitive element and the like. In the error amplifier, the output signal responds to precipitous fluctuations in the input signal with a limited time lag through the phase compensation circuit. This ensures a stable operation in the system.

Accordingly, a fixed period of time passes from an operation of inputting fluctuations in the observation voltage triggered by fluctuations in the output voltage to the error amplifier until an operation of amplifying a difference voltage between this observation voltage and the reference voltage in the error amplifier and outputting the result. Although the period of time from when the switching duty ratio is determined in accordance with the comparison result between the output signal and the oscillator signal of the error amplifier until the switching operation is carried out corresponds to a short period of time, transient fluctuations in the output voltage may not be sufficiently suppressed by the response lag in the error amplifier. Thus, the output voltage may temporarily fluctuate in a transient state, such as in the case of a sudden change in the load.

In this case, to suppress fluctuations in the output voltage, an output capacitor which has a sufficient capacitance value is preferably provided. This may lead to an increase in the size of the mounting components and the number of mounting components, resulting in a larger mounting area.

SUMMARY

According to an aspect of the embodiments discussed herein, a DC/DC converter control circuit includes an error amplifier amplifying an error voltage in response to an output voltage and a set voltage determined based on a reference voltage, the output voltage being output from an inductor based on supply of an input voltage to the inductor, a first controller controlling the output voltage to the set voltage by causing a switching operation of a switch included in a feed path of the input voltage to the inductor, in response to an output of the error amplifier, and an oscillator generating a periodical signal which determines a cycle of the switching operation of the switch, wherein the oscillator shortens a cycle of the periodical signal in case that the output voltage drops from the set voltage by a first voltage value or more.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The embodiments will be explained with reference to accompanying drawings.

Figure 1:
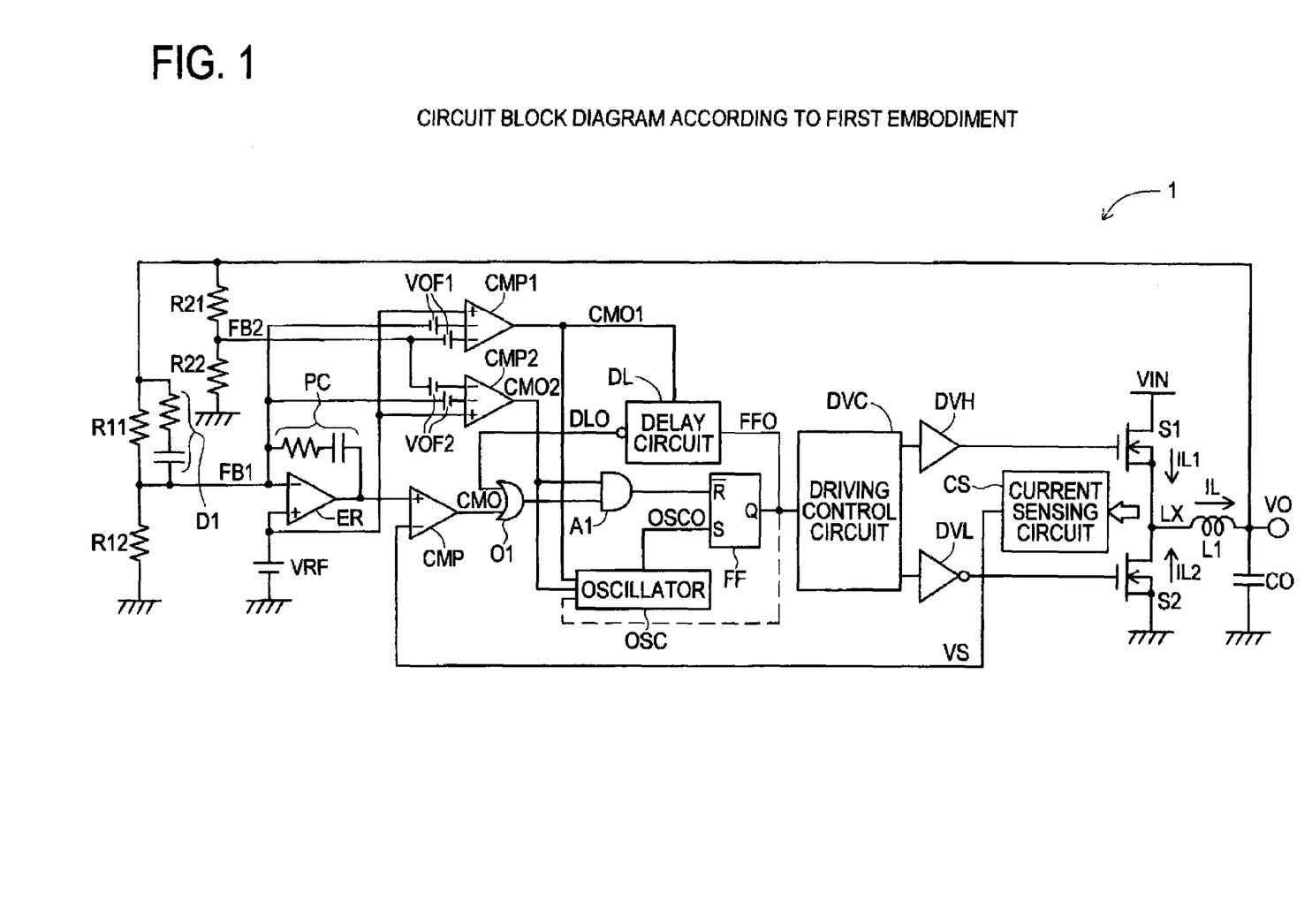
FIG. 1 is a circuit block diagram according to a first embodiment.

FIG. 1 is a circuit block diagram of an embodiment. Here, a step-down DC-DC converter 1 controlled in a current mode will be described as one example.

First, a circuit configuration will be described. In the step-down DC-DC converter 1, a main switch S1 and a synchronous rectifier switch S2 are connected in series between an input voltage VIN and a ground voltage. A connection node LX of the main switch S1 and the synchronous rectifier switch S2 is connected to one end of a choke coil L1. The other end of the choke coil L1 is connected to one end of an output capacitive element CO and to an output terminal VO. The other end of the output capacitive element CO is connected to the ground voltage.

In the DC-DC converter 1, the output terminal VO is connected to one terminal of a resistive element R11. The resistive element R11 is connected to a resistive element R12, and in turn, the resistive element R12 is connected to a ground potential. A differentiation circuit D1 made up of a resistive element and a capacitive element which are connected in series is connected between the output terminal VO and the connection node FB1 of the resistive elements R11 and R12. The output terminal VO is connected to one end of the resistive element R21. The resistive element R21 is connected to the resistive element R22, while the resistive element R22 is connected to the ground potential.

The connection node FB1 of the resistive elements R11 and R12 is connected to one inverted input terminal of the voltage comparators CMP 1 and CMP2 and to an inverted input terminal of the differential amplifier ER. A non-inverted input terminal of the differential amplifier ER is connected to a reference voltage source VRF. The differential amplifier ER is connected to the phase compensation circuit PC made up of a resistive element and a capacitive element which are connected in series between an output terminal and an inverted input terminal thereof.

The output terminal of the differential amplifier ER is connected to a non-inverted input terminal of the voltage comparator CMP. An output terminal of a current sensing circuit CS is connected to the inverted input terminal of the voltage comparator CMP. An output terminal CMO of the voltage comparator CMP is connected to one input terminal of an OR gate O1. An output terminal of a delay circuit DL is connected to one input terminal of the OR gate O1. The output terminal of the OR gate O1 is connected to one input terminal of an AND gate A1. The other input terminal of the AND gate A1 is connected to an output terminal CMO2 of the voltage comparator CMP2.

An output terminal of an oscillator OSC is connected to a set terminal (S) of a flip-flop FF, while an output terminal of the AND gate A1 is connected to a reset terminal (/R). An output terminal FFO of the flip-flop FF is connected to an input terminal of the delay circuit DL and to a driving control circuit DVC. In a second circuit example as will be described later, the output terminal FFO is connected to the oscillator OSC. A driving control circuit DVC is connected to respective gate terminals of a main switch S1 and a synchronous rectifier switch S2 through a high-side driver DVH or a low-side driver DVL.

A connection node FB2 of the resistive elements R21 and R22 is connected to the other inverted input terminals of the voltage comparators CMP1 and CMP2. The non-inverted input terminals of the voltage comparators CMP1 and CMP2 are connected to the reference voltage source VRF. The voltage comparators CMP1 and CMP2 have offset voltages VOF1 and VOF2 in a comparison voltage, as is conceptually illustrated in FIG. 1. The voltage comparator CMP1 has an offset voltage VOF1 at a negative voltage side, with respect to divided voltages VFB1 and VFB2 of an output voltage VO to be outputted to the respective connection nodes FB1 and FB2. The voltage comparator CMP2 has an offset voltage VOF2 at a positive voltage side, with respect to divided voltages VFB1 and VFB2 of an output voltage VO to be outputted to the respective connection nodes FB1 and FB2. An output terminal CMO1 of the voltage comparator CMP1 is connected to the delay circuit DL and the oscillator OSC. The output terminal CMO2 of the voltage comparator CMP2 is connected to the oscillator OSC.

Next, the circuit operation will be described. The DC-DC converter 1 is controlled in a current mode. First, a steady state will be described. The output voltage VO to be outputted from the output terminal VO is divided by resistive elements R11 and R12 and the divided voltage VFB1 is inputted from the connection node FB1 to the differential amplifier ER. The differential amplifier ER amplifies a difference voltage obtained by subtracting the divided voltage VFB1 from the reference voltage VRF. Here, the reference voltage VRF is outputted from the reference voltage source VRF. The fluctuations in the output voltage VO are differentiated by the differentiating circuit D1 which is connected between the output terminal VO and the connection node FB1 and are superimposed on the divided voltage VFB1. Thus, fluctuations in the output voltage VO may be detected.

The error amplification voltage which was amplified in the differential amplifier ER is inputted to the voltage comparator CMP. A sense voltage VS in accordance with a coil current IL1 of the main switch S1 as detected by the current sensing circuit CS is inputted to the voltage comparator CMP for voltage comparison with the error amplification voltage. Here, the coil current IL1 flows through the main switch in the case the main switch S1 is in an ON state. When the synchronous rectifier switch S2 is in an ON state, the coil current IL2 flows to the synchronous rectifier switch S2. A coil current IL flows to the choke coil L1 in the form of coil currents IL1 and IL2.

If the error amplification voltage is larger as compared to the sense voltage VS, a high level output signal CMO is outputted from the voltage comparator CMP. Then, a low level signal is outputted by reversing a voltage magnitude relationship.

The oscillator OSC outputs an oscillator signal with a predetermined oscillation frequency. In a steady state, divided voltage VFB1 generated by the resistive elements R11 and R12 and divided voltage VFB2 generated by the resistive elements R21 and R22 represent voltages which are not lower with respect to the reference voltage VRF by an amount equivalent to the offset voltage VOF1 or more, and are not higher with respect to the reference voltage VRF by an amount equivalent to the offset voltage VOF2 or more. Thus, a low level voltage is outputted from the voltage comparator CMP1, and a high level voltage is outputted from the voltage comparator CMP2. The oscillator OSC operates at an oscillation frequency which becomes the reference in this state.

An oscillator signal OSCO to be outputted from the oscillator OSC is inputted to the set terminal (S) of the flip flop FF. The flip flop FF is set in each cycle of the oscillator signal OSCO and outputs a high level signal with respect to a high-side driver DVH and a low-side driver DVL. Thus, the main switch S1 is turned ON, while the synchronous rectifier switch S2 is turned OFF. The coil current IL1 thus flows from the input voltage VIN to the choke coil L1 through the main switch S1. When the main switch S1 is in an ON state, a positive voltage (VIN-VO) is applied to both ends of the choke coil IL1 in the direction of flow of the coil current IL1. Thus, the coil current IL1 increases in proportion to time.

This state continues until the flip flop FF is reset. The flip flop FF is reset by changing the output signal of the AND gate A1 to be inputted to the reset terminal (/R) to a low level signal. The input terminal of the AND gate A1 is connected to the output terminal CMO2 of the voltage comparator CMP2 and the output terminal of the OR gate O1. As the output signal CMO2 of the voltage comparator CMP2 is kept at a high level in a steady state, resetting of the flip flop FF is conditioned by changing the output signal of the OR gate O1 to a low level.

The output terminal DLO of the delay circuit DL and the output terminal CMO of the voltage comparator CMP are connected to the OR gate O1. As the output signal DLO of the delay circuit DL is kept to a low level in a steady state, as will be described later, reset of the flip flop FF is conditioned by changing the output signal CMO of the voltage comparator CMP to a low level. The output signal CMO of the voltage comparator CMP changes to a low level on condition the sense voltage VS exceeds the error amplification voltage.

For example, when the sense voltage VS exceeds the error amplification voltage, control is carried out wherein the main switch S1 is turned OFF to block off the coil current IL1. The sense voltage VS is directly proportional to the coil current IL1, and the coil current IL1 increases in proportion to time. Thus, the voltage comparator CMP controls the peak value of the coil current IL1 in accordance with the error amplification voltage. If the divided voltage VFB1 is lower with respect to the reference voltage VRF, the error amplification voltage becomes a high voltage value in the differential amplifier ER as the difference voltage obtained by subtracting the divided voltage VFB1 from the reference voltage VRF becomes higher. At a higher sense voltage VS, the voltage comparator CMP is inverted, so that the peak current value of the coil current IL1 becomes higher. The peak value of the coil current IL1 is controlled to be larger as the output voltage VO which is detected as divided voltage VFB1 is a lower voltage value in comparison with a set value based on the reference voltage VRF. Control is thus carried out so that the output voltage becomes closer to the set value.

If the divided voltage VFB1 is high as compared to the reference voltage VRF, the error amplification voltage is to the lowest voltage level. One condition in the voltage comparator CMP includes changing of the output signal CMO to a low level even in the sense voltage VS having the lowest voltage level. After the flip flop FF is set, a reset operation is promptly carried out. Thus, the main switch S1 is practically kept OFF, and power supply to the output terminal VO is practically stopped.

Here, the drive control circuit DVC outputs a driving signal to the high-side driver DVH and the low-side driver DVL with respect to the output signal of the flip flop FF. To prevent the main switch S1 and the synchronous rectifier switch S2 from being turned on simultaneously and the through current from flowing in the synchronous rectifier-type DC-DC converter 1, when switching the conductive state of the respective switches S1 and S2, both switches S1 and S2 are switched by passing through an OFF state. In general, a so-called dead-time operation is carried out. The drive control circuit DVC serves to control the operation in such a circuit.

Next, a description will be given with respect to the circuit operation in a transient state wherein the output voltage VO fluctuates temporarily from the set voltage. Also, in such a transient state, the excess and deficiency from the set voltage of the output voltage VO is eliminated by the control operation of the output voltage VO in the steady state as described above.

For example, the divided voltage VFB1 increases or decreases in response to a transient increase or decrease in the output voltage VO. Such increase or decrease in the divided voltage VFB1 is reflected in the error amplification voltage in the differential amplifier ER and is then outputted therefrom. When the output voltage VO increases, causing an increase in the divided voltage VFB1, control is carried out so as to decrease the error amplification voltage, causing a decrease in the peak current of the coil current Il1. Also, when the output voltage VO decreases, causing a decrease in the divided voltage VFB1, control is carried out so as to increase the error amplification voltage, causing an increase in the peak current of the coil current IL1. As a result, a transient increase or decrease in the output voltage VO is eliminated.

However, with such a circuit configuration, this response is determined over a predetermined response period of time. This response time represents the response lag in a circuit configuration including the phase compensation circuit PC provided in the differential amplifier ER to ensure a stable circuit operation in a feed-back system. If the transient fluctuations in the output voltage VO are caused by a sudden increase or decrease in the load current, the ON/OFF control operation of the main switch S1 and the synchronous rectifier switch S2 continues in the state prior to the increase or decrease in the load current even after such increase or decrease in the load current. This is mainly due to transient fluctuations in the output voltage VO. Accordingly, the range of the transient fluctuations in the output voltage VO becomes larger as the response lag time becomes longer.

The DC-DC converter 1 disclosed in the present embodiment operates prior to a control operation of the output voltage VO through a normal control operation as described earlier, carrying out control to reduce the range of fluctuations in the output voltage VO triggered by such response lag. For example, this converter has voltage comparators CMP1 and CMP2. The voltage comparators rapidly detect an increase or decrease in the output voltage VO in excess of a predetermined voltage level to carry out control to eliminate fluctuations in the output voltage VO at high speed.

The voltage comparators CMP1 and CMP2 are for applying thereto offset voltages VOF1 and VOF2, respectively, for comparison. When the division voltages VFB1 and VFB2 drop from the reference voltage VRF by an amount equivalent to the offset voltage VOF1 or more, the voltage comparator CMP1 detects that the output signal CMO1 is reverted to a high level and the output voltage VO decreases temporarily. When the division voltages VFB1 and VFB2 exceed the reference voltage VRF by the offset voltage VOF1 or more, the voltage comparator CMP2 detects that the output signal CMO2 reverts to a low level and the output voltage VO increases temporarily.

Once it is detected that the output signal CMO1 of the voltage comparator CMP1 is reverted to a high level and the output voltage VO decreases temporarily, the following three types of controls are carried out. In a first control, an oscillation frequency of the oscillator signal OSCO to be outputted from the oscillator OSC is increased. Thus, the switching frequency per each unit of time increases, promoting power supply to the output terminal VO. In a second control, the main switch S1 is turned ON in accordance with the detection results. Power is thus supplied to the output terminal VO, controlling a decrease in the output voltage VO. In a third control, the minimum time while the main switch S1 is turning ON is extended in one cycle. Thus, the main switch S1 may be maintained in an ON state for a period of time exceeding the ON time which is determined by controlling the output voltage VO in a steady state. The ON time of the main switch S1 is extended for the period of the response lag as well, promoting power supply to the output terminal VO.

Once it is detected the output signal CMO2 of the voltage comparator CMP2 is reverted to a low level and the output voltage VO increases temporarily, control is carried out to suppress the ON operation of the main switch S1. For instance, the oscillating operation of the oscillator OSC is stopped, or otherwise, the output of the oscillator signal OSCO is suppressed. As a result, power supply to the output terminal VO is stopped, preventing excessive supply of power.

Next, the individual controls will be described.

Figure 3:
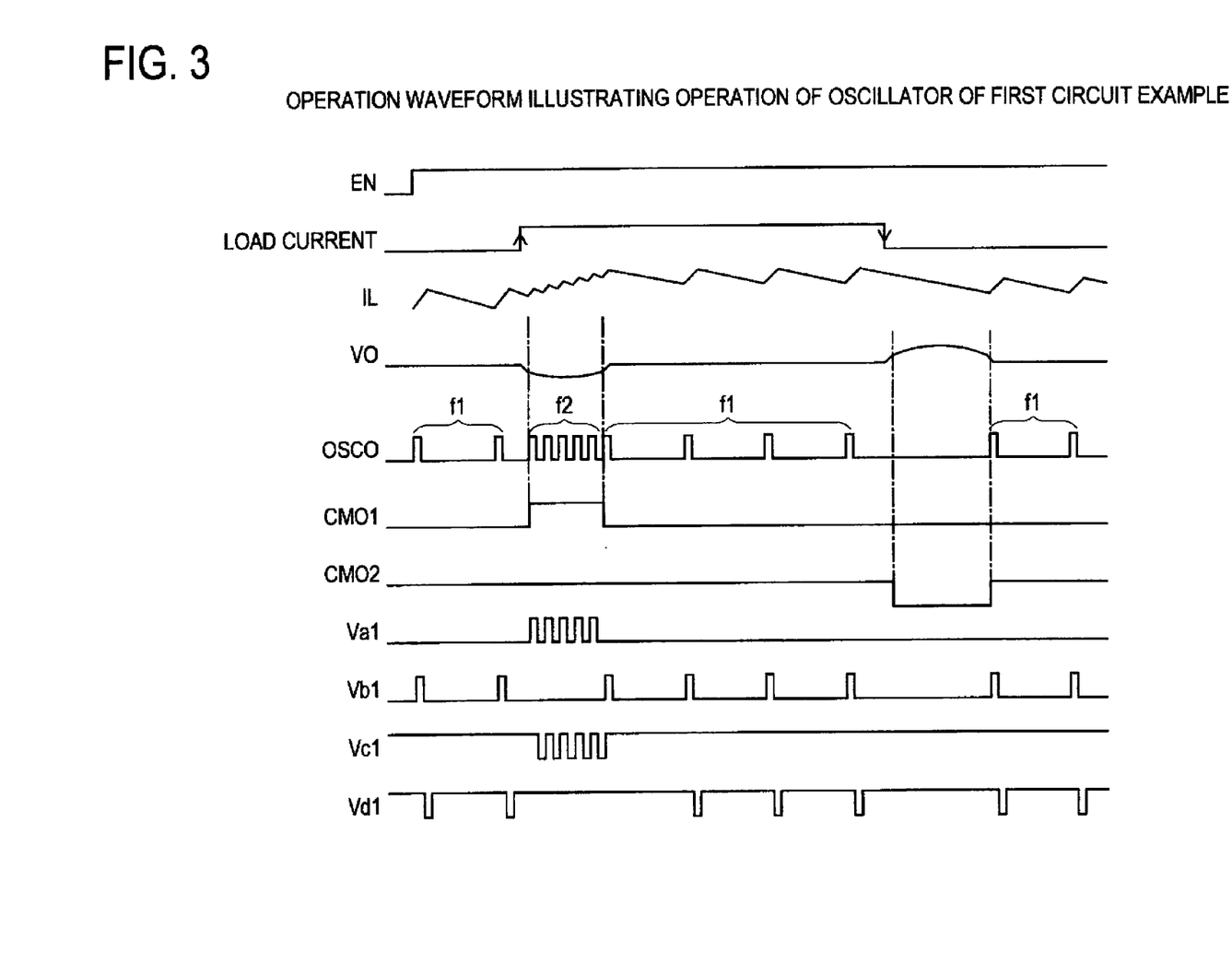
FIG. 3 is an operation waveform diagram illustrating the operation in a transient state in the first circuit example.
Figure 4:
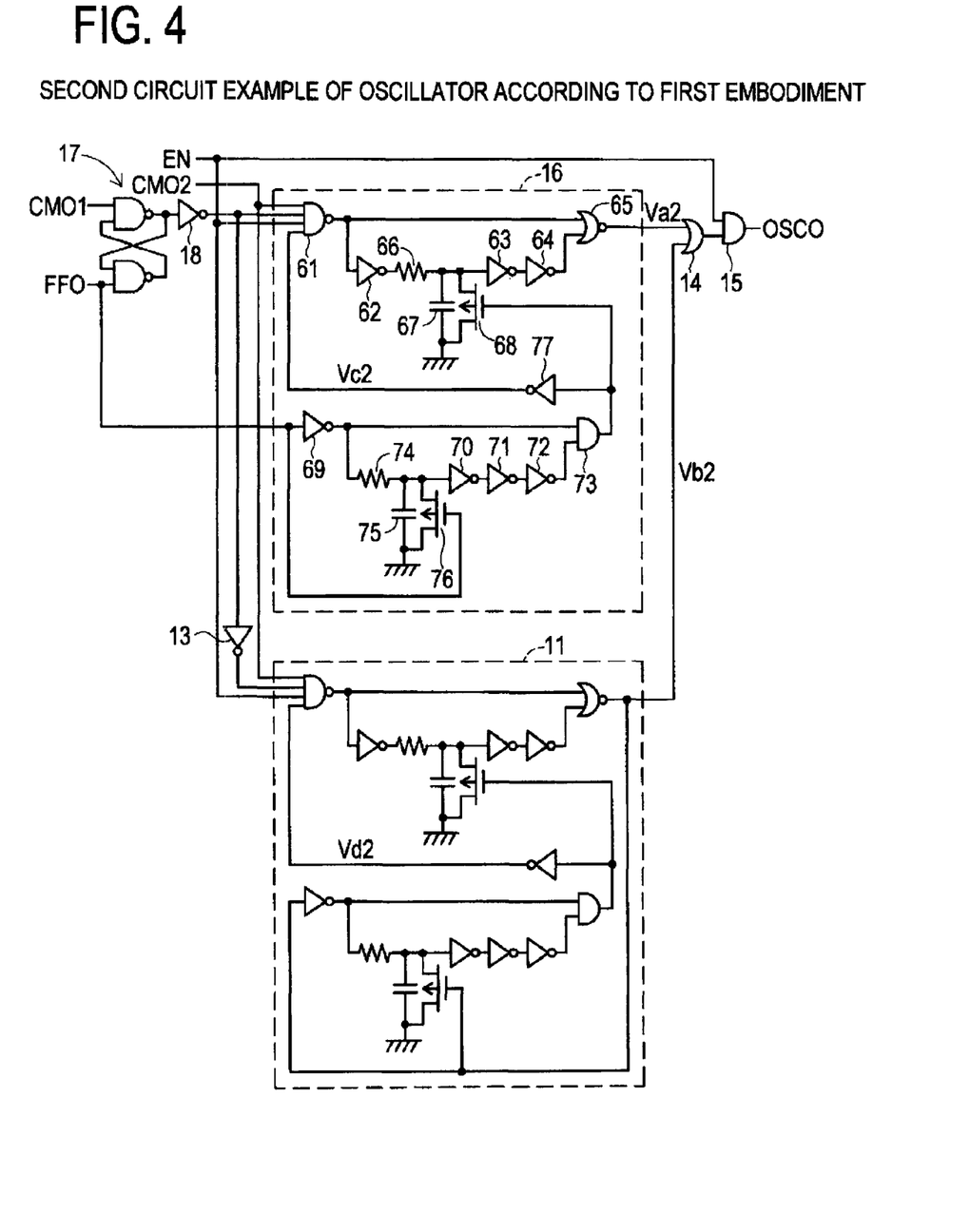
FIG. 4 is a second circuit example of the oscillator according to the first embodiment.
Figure 5:
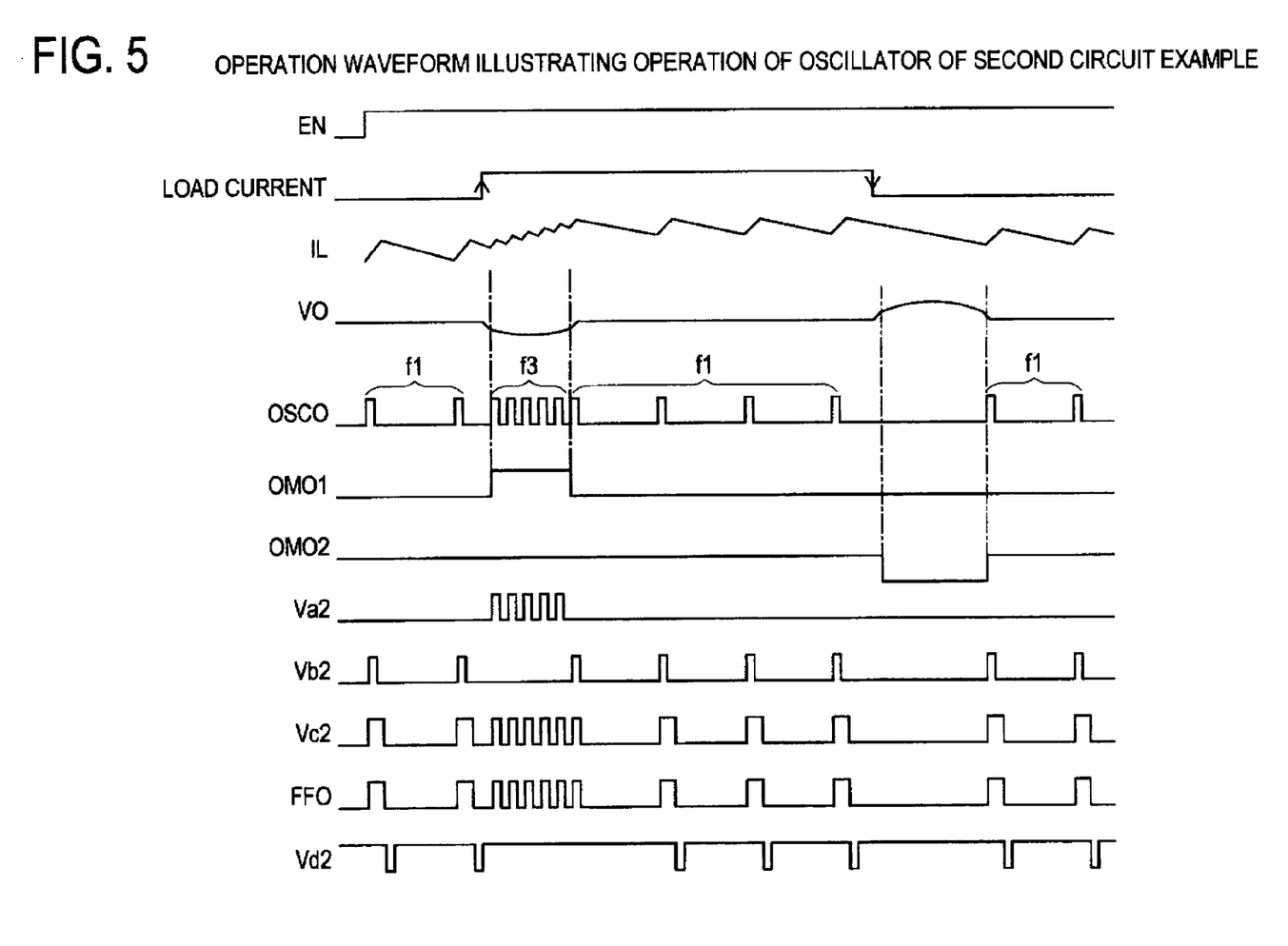
FIG. 5 is an operation waveform diagram illustrating the operation in a transient state in the second circuit example.

In a first control in the case the output voltage VO decreases temporarily, the oscillation frequency of the oscillator OSC is switched to a higher frequency in comparison with the frequency which is handled as reference frequency in a steady state in response to a high level output signal CMO1 of the voltage comparator CMP1 (illustrated in FIG. 2 and FIG. 3 as a first example), or otherwise, the oscillation cycle is shortened by controlling the OFF time of the oscillator signal OSCO (illustrated in FIG. 4 and FIG. 5 as a second example).

Figure 2:
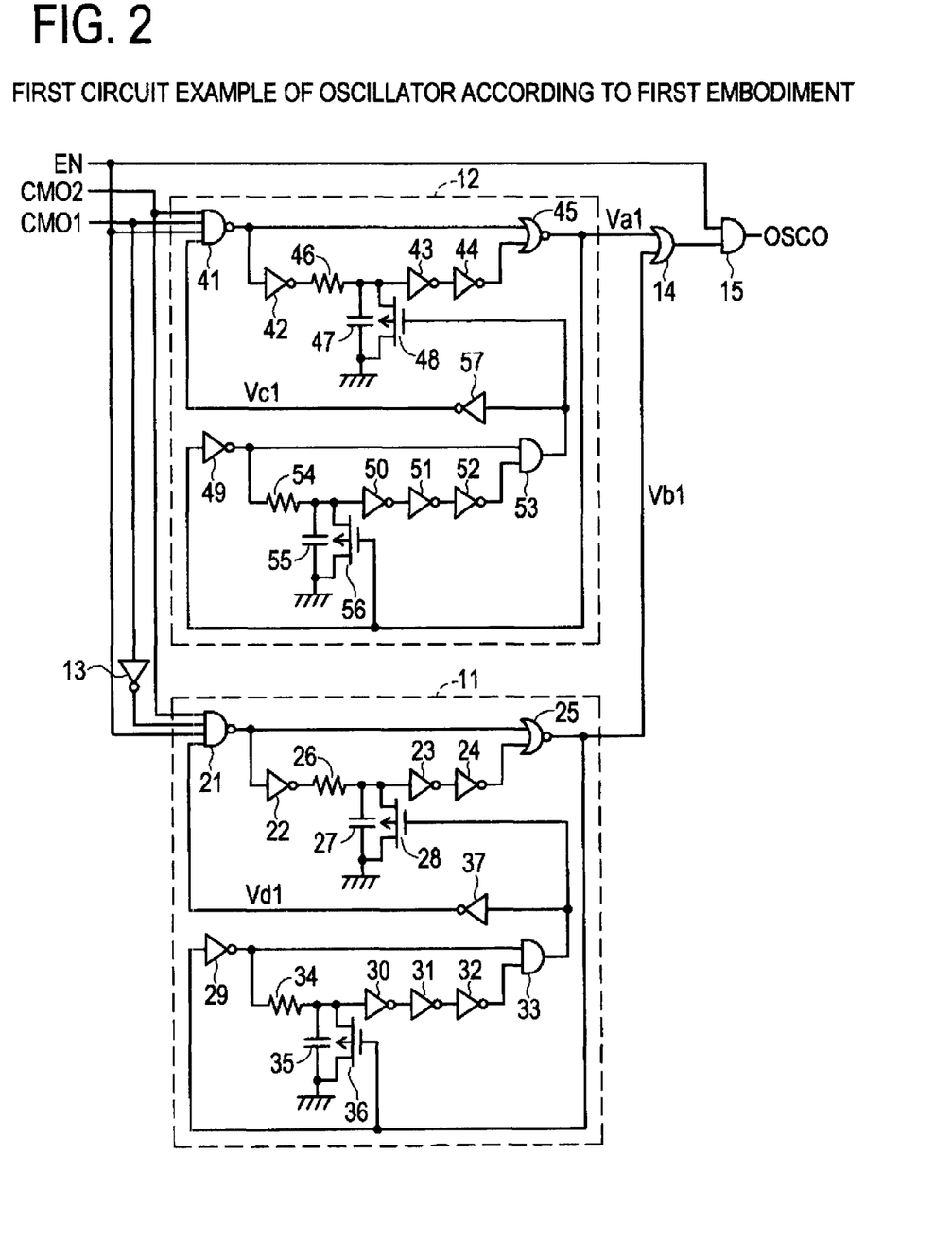
FIG. 2 is a first circuit example of an oscillator according to the first embodiment.

In the second control for the case the output voltage VO decreases temporarily, the oscillator signal OSCO is outputted from the oscillator OSC in response to the high level output signal CMO1 of the voltage comparator CMP1. Power may thus be supplied to the output terminal VO without delay in detection of a transient decrease in the output voltage VO by the voltage comparator CMP1. The examples are illustrated in FIG. 2 thorough FIG. 5.

In the control for the case the output voltage VO increases temporarily, the oscillator signal OSCO from the oscillator OSC is stopped in response to a low level detection signal CMO2 of the voltage comparator CMP2. The flip flop FF is not set by stopping the oscillator signal OSCO, keeping the main switch S1 in an OFF state. Examples are illustrated in FIG. 2 through FIG. 5.

Examples regarding the above-described controls will now be described. FIG. 2 depicts a first circuit example of the oscillator OSC. The oscillator OSC has two oscillating units (a first oscillating unit 11 and a second oscillating unit 12) which have the similar circuit configuration and operate at different oscillation frequencies. The first oscillating unit 11 has the following configuration.

An output terminal of a NAND gate 21 is connected to one input terminal of a NOR gate 25 and an input terminal of an inverter 22. The inverter 22 is connected to two inverters 23 and 24 which are connected in series through a resistive element 26. An output terminal of the inverter 24 is connected to the other input terminal of the NOR gate 25. A delay circuit is made up of inverters 22 through 24 which are connected in series in odd stages, a resistive element 26 and a capacitive element 27. The capacitive element 27 and a NMOS transistor 28 are connected between the ground voltage and a connection node between the resistive element 26 and the inverter 23. An output terminal of an AND gate 33 is connected to a gate terminal of the NMOS transistor 28.

An output terminal of the NOR gate 25 is connected to the input terminal of an inverter 29. An output terminal of the inverter 29 is connected to one input terminal of the AND gate 33 and one terminal of a resistive element 34. The other terminal of the resistive element 34 is connected to the capacitive element 35 and the NMOS transistor 36, and is also connected to the inverters 30 through 32 which are connected in series. A delay circuit is made up of the resistive element 34, a capacitive element 35 and inverters 30 through 32 which are connected in series in odd stages. An output terminal of the AND gate 33 is connected to the NAND gate 21 through an inverter 37. The other terminal of the capacitive element 35 and a NMOS transistor 36 are connected to the ground voltage. The gate terminal of the NMOS transistor 36 is connected to the output terminal of the NOR gate 25.

A NAND gate 41 of the second oscillating unit 12, the inverters 42 through 44, 49, 50 through 52 and 57, a NOR gate 45, the AND gate 53, a resistive elements 46 and 54, a capacitive elements 47 and 55 and a NMOS transistors 48 and 56 provided therein respectively correspond to the NAND gate 21 of the first oscillating unit 11, inverters 22 through 24, 29, 30 through 32, and 37, the NOR gate 25, the AND gate 33, the resistive elements 26 and 34, the capacitive elements 27 and 35 and the NMOS transistors 28 and 36 provided therein. These have the similar circuit configuration.

In the first circuit example, the input terminal of the oscillator OSC is connected to the NAND gate 21 of the first oscillating unit 11 and the input terminal of the NAND gate 41 of the second oscillating unit 12. An enable signal EN (not illustrated in FIG. 1) and the output terminal CMO2 of the voltage comparator CMP2 are connected in common to NAND gates 21 and 41. The output terminal CMO1 of the voltage comparator CMP2 is connected to the first oscillating unit 11 through inverter 13 and to the second oscillating unit 12 as is.

The output terminal of the NOR gate 25 in the first oscillating unit 11 and the output terminal of the NOR gate 45 in the second oscillating unit 12 are connected to the input terminal of the OR gate 14. The output terminal of the OR gate 14 is connected to the input terminal of the AND gate 15. The enable signal EN is inputted to the other input terminal of the AND gate 15. The oscillator signal OSCO is outputted from the AND gate 15.

The operation corresponding to transient fluctuations in the output voltage VO will now be described while referring to FIG. 3. First, when the control operation is started, the enable signal EN transits to a high level. Thus, the oscillator OSC starts oscillating. In a steady state, the output signal CMO1 of the voltage comparator CMP1 is at a low level and the output signal CMO2 of the voltage comparator CMP2 is at a high level. Accordingly, the output signal of the NAND gate 41 is fixed to a high level, and as a result, preventing the second oscillating unit 12 from fluctuating. On the other hand, the first oscillating unit 11 oscillates.

The output signal of the NAND gate 21 transits to a low level in response to transition of the enable signal EN to a high level. The NOR gate 25 outputs a high pulse signal Vb1 which handles a delay time as pulse width. This delay time is timed by a delay circuit made up of the inverters 22 through 24, the resistive element 26 and the capacitive element 27. The high pulse signal Vb1 is inputted to the gate terminal of the NMOS transistor 36, resetting the input terminal of the inverter 30 to a low level. A low pulse signal is outputted from the inverter 29. After the input terminal of the inverter 30 is reset to a low level, a high pulse signal is outputted from the AND gate 33 following the longer delay time from the time periods timed at the delay circuit made up of the inverters 22 through 24, the resistive element 26 and the capacitive element 27 and the delay circuit made up of the resistive element 34, the capacitive element 35 and inverters 30 through 32. This high pulse signal is inputted to the gate terminal of the NMOS transistor 28, resetting the input terminal of the inverter 23 to a low level. The low pulse signal Vd1 is inverted in the inverter 37 and the result is then outputted. The output signal of the NAND gate 21 transits to a low level in response to transition of the low pulse signal Vd1 to a high level. Hereinafter, the similar operation is repeated, causing fluctuations in the high pulse signal Vb1. The oscillation cycle at this time is substantially equal to a period of time obtained by summing up the periods of time timed at the delay circuit made up of inverters 22 through 24, the resistive element 26 and the capacitive element 27, and the delay circuit made up of the resistive element 34, the capacitive element 35 and inverters 30 through 32. In this case, the condition is that the delay time at the latter delay circuit is not shorter than the delay time at the former delay circuit.

The high pulse signal Vb1 propagates to the AND gate 15 through the OR gate 14. As the enable signal EN is at a high level, this signal is outputted as the oscillator signal OSCO.

Once the load current increases suddenly, the output voltage VO is decreased temporarily. Once the voltage comparator CMP1 detects this state and the high level output signal CMO1 is outputted, the second oscillating unit 12 starts oscillating in place of the first oscillating unit 11.

In this case, in the second oscillating unit 12, the NAND gate 41 receives the high level output signal CMO1, and the output signal immediately transits to a low level. A high-pulse signal Va1 is outputted through the NOR gate 45 to which a low level signal outputted from the NAND gate 41 is inputted.

As a result, the oscillator signal OSCO transits to a high level. The voltage comparator CMP1 carries out the second control for the case the output voltage VO decreases temporarily through the NAND gate 41, the NOR gate 45, the OR gate 14 and the AND gate 15. The oscillator signal OSCO is outputted in response to the transient decrease in the output voltage VO. Thus, power supply to the output terminal VO may be carried out without delay in the transient decrease in the output voltage VO.

The circuit operation of the second oscillating unit 12 is the similar as the circuit operation of the first oscillating unit 11, and therefore, further description thereof is hereby omitted. The oscillation frequency in the second oscillating unit 12 represents a period of time which is substantially equal to a period of time obtained by summing up the periods of time timed at the delay circuit made up of inverters 42 through 44, resistive element 46 and capacitive element 47, and the delay circuit made up of the resistive element 54, the capacitive element 55, and the inverters 50 through 52. The delay times of the respective delay circuits are set to be shorter as compared to the delay time of the delay circuit provided in the first oscillating unit 11. The oscillation frequency of the second oscillating unit 12 is higher as compared to the oscillation frequency of the first oscillating unit 11.

As a result, the first control for the case the output voltage VO decreases temporarily is carried out. In this case, the oscillation frequency is set to a higher frequency as compared to a steady state, causing the oscillator OSC to operate. As a result, the number of switching operations per unit of time increases, promoting power supply to the output terminal VO.

In the first oscillating unit 11, the output signal of the NAND gate 21 is set to a high level. As a result, the high pulse signal Vb1 which is outputted from the NOR gate 25 is fixed to a low level. Further, the output signal of the AND gate 33 is fixed to a low level through the inverter 29, and the low pulse signal Vd1 to be outputted through inverter 37 is fixed to a high level.

Next, once the load current suddenly decreases, the output voltage VO increases temporarily. The voltage comparator CMP2 detects this state, and outputs a low level output signal CMO2. As a result, the output signal of the NAND gate 21 of the first oscillating unit 11 and the output signal of the NAND gate 41 of the second oscillating unit 12 are fixed in common to a high level. The high pulse signals Vb1 and Va1 which are outputted from the NOR gates 24 and 45 are both fixed to a low level, and the oscillator signal OSCO is set to a low level.

As a result, control for the case that the output voltage VO increases temporarily is carried out. Output of the oscillator signal OSCO is thus stopped in response to a transient increase in the output voltage VO. Power supply to the output terminal VO may thus be stopped with decreasing any delay from the transient increase in the output voltage VO.

FIG. 4 is a second circuit example of the oscillator OSC. This oscillator OSC has a first oscillating unit 11 as illustrated in the first circuit example (FIG. 2) and a third oscillating unit 16 wherein the low level time of the oscillator signal OSCO is fixed. As the configuration and effects of the first oscillating unit 11 are the similar as those of the first circuit example (FIG. 2), a further description thereof is hereby omitted.

In the third oscillating unit 16, a NAND gate 61, an inverters 62 through 64, 69, 70 through 72 and 77, a NOR gate 65, an AND gate 73, the resistive elements 66 and 74, a capacitive elements 67 and 75 and a NMOS transistors 68 and 76 respectively correspond to the NAND gate 21 of the first oscillating unit 11 (FIG. 2), inverters 22 through 24, 29, 30 through 32 and 37, the NOR gate 25, the AND gate 33, the resistive elements 26 and 34, the capacitive elements 27 and 35 and the NMOS transistors 28 and 36. In the first oscillating unit 11 (FIG. 2), the high pulse signal Vb1 which is the output signal of the NOR gate 25 is inputted to the inverter 29 and the NMOS transistor 36. However, in the third oscillating unit 16, the output signal FFO of the flip flop FF is inputted to an inverter 69 and a NMOS transistor 76. In addition, a latch circuit 17 and an inverter 18 to which the output terminal of such latch circuit 17 is connected are also provided.

In the latch circuit 17, an output signal CMO1 of the voltage comparator CMP1 is inputted to a NAND gate thereof which is connected to the inverter 18, and an output signal FFO of the flip flop FF is inputted to an other NAND gate thereof. The output terminal of the inverter 18 is inputted to the NAND gate 61 and the inverter 13, in place of the output signal CMO1 of the voltage comparator CMP1 which is inputted to the first oscillating unit 11 (FIG. 2).

As illustrated in FIG. 4, the latch 17 circuit is not provided. Here, the output signal CMO1 may be inputted to the NAND gate 61 and the inverter 13 and the output signal FFO may be inputted to the inverter 69 and the NMOS transistor 76.

The operation corresponding to the transient fluctuations in the output voltage VO will be described while referring to FIG. 5. In the second circuit example, the second control for the case that the output voltage VO decreases temporarily, control for the case that the output voltage VO increases temporarily, and control in a steady state are the similar as controls for the case of the first circuit example. Therefore, further description thereof is hereby omitted.

Once the load current suddenly increases and the output voltage VO decreases temporarily, the voltage comparator CMP1 outputs a high level output signal CMO1. If the flip flop FF is in a reset state at this time, a low level output signal is latched in the latch circuit 17, causing a high level signal to be supplied through the inverter 18. As a result, the first oscillator 11 stops oscillating, while the third oscillator 16 starts oscillating.

In the third oscillating unit 16, the output signal of the NAND gate 61 transits to a low level. The low level signal outputs a high pulse signal Va2 through the NOR gate 65. The high pulse signal Va2 is outputted as an oscillator signal OSCO.

The high level oscillator signal OSCO sets the flip flop FF and changes the output signal FFO to a high level. Thereafter, the flip flop FF is reset, and the output signal FFO is returned to a low level. The output signal FFO is also inputted to the inverter 69. The AND gate 73 outputs a high pulse signal whose time is timed by a delay circuit made up of the resistive element 74, the capacitive element 75 and the inverters 70 through 72, with the starting point being the transition of the output signal FFO to a low level. This high pulse signal is reflected by the inverter 77 and is inputted to the NAND gate 61. The output signal of the inverter 77 transits to a high level in response to completion of the high level signal to be outputted from the AND gate 73. If the state wherein the output voltage VO decreases continues, the output signal CMO1 of the voltage comparator CMP1 is kept at a high level, and a high level output signal of the inverter 18 is outputted through the latch circuit 17. As a result, a high pulse signal is outputted as an oscillator signal OSCO in response to transition of the inverter 77 to a high level. The oscillator signal OSCO may be outputted by self oscillation.

As a result, the oscillator signal OSCO is a periodical signal having a low level time which is timed in a delay circuit made up of the restive element 74, the capacitive element 75 and inverters 70 through 72, and a high level time which is timed at a delay circuit made up of inverters 62 through 64, resistive elements 66 and capacitive element 67. If the delay time for the former circuit is set to a shorter time as compared to the delay time of the latter circuit, a periodical signal with a short low level time may be obtained.

As a result, the first control for the case that the output voltage VO is decreased temporarily is carried out. In this case, the oscillator signal OSCO is outputted in a self-oscillation operation wherein the oscillation frequency is higher as compared to a steady state. As the oscillator signal OSCO has a limited low level time, the number of switching operations per unit of time increases, promoting power supply to the output terminal VO.

Next, the third control for the case that the output voltage VO decreases temporarily will now be described. In this control, the minimum time while the main switch S1 is turned ON is extended in response to the high level output signal CMO1 of the voltage comparator CMP1. In FIG. 1, the delay circuit DL applies the delay time with respect to transition of the output signal FFO from the flip flop FF to a high level. Once the flip flop FF is reset and the output signal FFO transits to a high level, the delay time is timed. In this meantime, the output signal DLO of the delay circuit DL is kept at a high level. The output signal DLO is inputted to the OR gate O1 together with the output signal CMO of the voltage comparator CMP. The flip flop FF is reset in response to transition of these signals to a low level.

If the error amplification voltage is at a low voltage level, the output signal CMO of the voltage comparator CMP transits to a low level, at a low level sense voltage VS. As the output signal DLO of the delay circuit DL is fixed to a low level while in a steady state, the flip flop FF is reset at the point of transition of the output signal CMO to a low level. The peak value of the coil current IL1 is kept to a low level.

In the third control for the case that the output voltage VO decreases temporarily, the output signal DLO is kept to a high level during the delay time which is timed by the delay circuit DL from the transition of the output signal FFO to a high level. During this time, the flip flop FF is not reset. Thus, the minimum ON time for the main switch S1 may be extended irrespective of the voltage level of the error amplification voltage.

Figure 6:
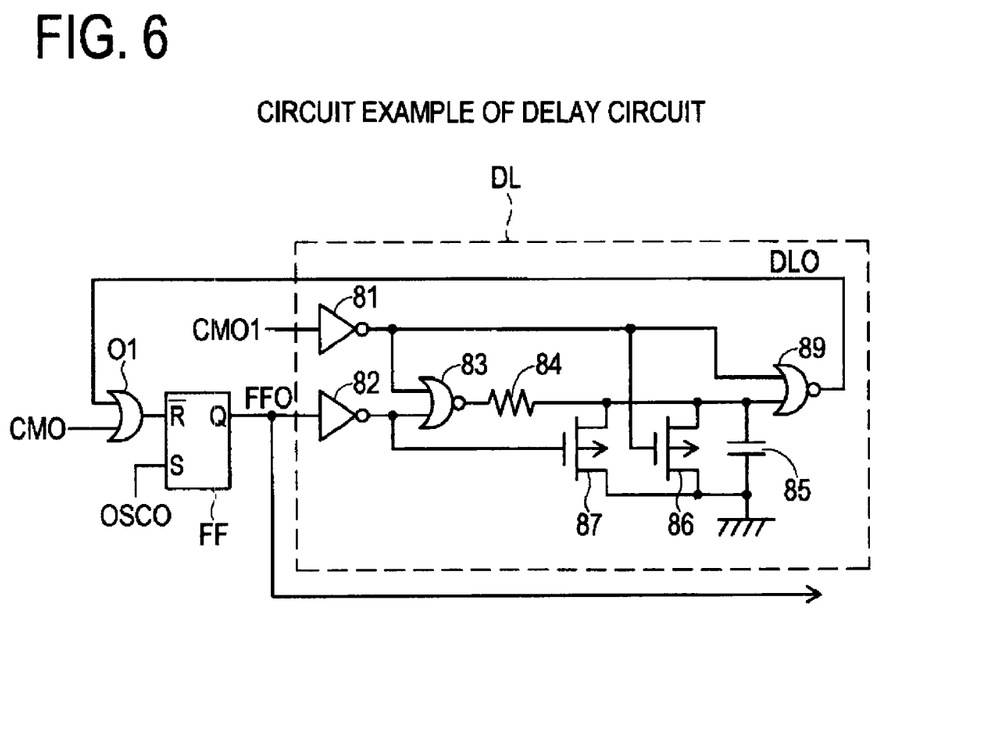
FIG. 6 is circuit example of a delay circuit according to the first embodiment.
Figure 7:
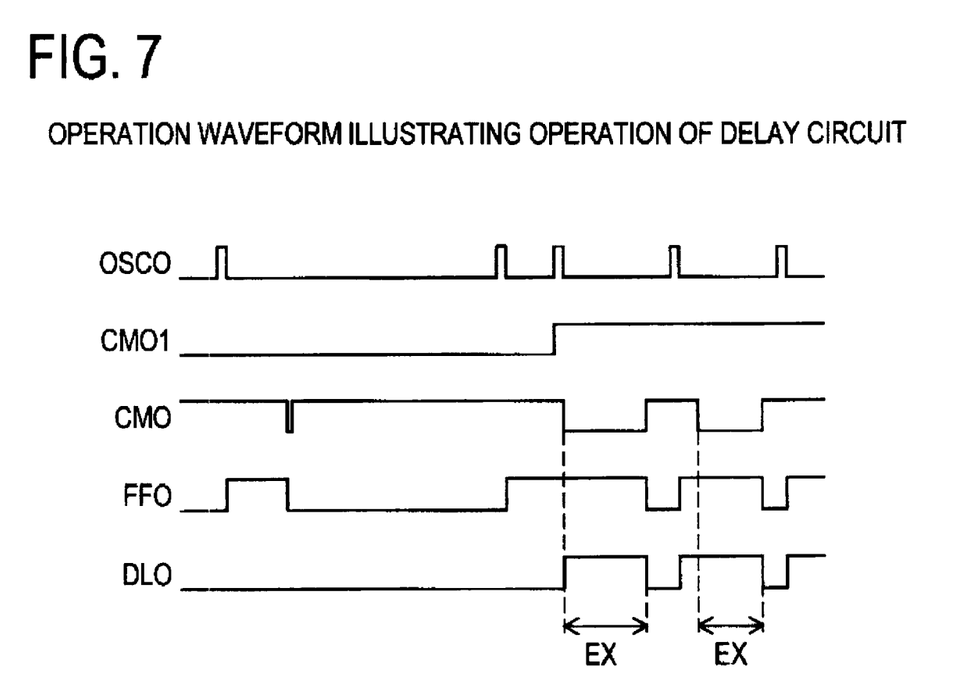
FIG. 7 is an operation waveform diagram illustrating the operation in a circuit example of the delay circuit.

FIG. 6 illustrates an example of the delay circuit DL. FIG. 7 illustrates the operation waveform. In FIG. 6, the AND gate A1 is omitted to simplify the description.

In the delay circuit DL, the output signal CMO1 of the voltage comparator CMP1 is inputted to an inverter 81. The output signal FFO of the flip flop FF is inputted to an inverter 82. The output terminal of the inverter 81 is connected to an input terminals of a NOR gates 83 and 89. The output terminal of the inverter 82 is connected to the other input terminal of the NOR gate 83 and the gate terminal of a NMOS transistor 87. The output terminal of the NOR gate 83 is connected to a resistive element 84, while the resistive element 84 is connected to the other input terminal of the NOR gate 89. The resistive element 84 is also connected to the drain terminals of the NMOS transistors 86 and 87 and a capacitive element 85. The output signal DLO is outputted from the output terminal of the NOR gate 89. The source terminals of the NMOS transistors 86 and 87 and the capacitive element 85 is connected to a ground voltage.

An operation waveform is illustrated in FIG. 7. Once the output voltage VO decreases temporarily and the output signal CMO1 of the voltage comparator CMP1 is reverted to a high level, the NOR gates 83 and 89 function as an inverter in the delay circuit DL, and is activated as a delay circuit. In this state, once the high level state of the output signal FFO is detected in the flip flop FF, the high level signal is inputted to the delay circuit made up of a resistive element 84 and the capacitive element 85 through the inverter 82 and the NOR gate 83. Here, the delay time is applied. The signal from the restive element 84 transits to a high level with some delay and is inverted in the NOR gate 89. The output signal DLO which is inverted to a low level is outputted from the delay circuit DL.

As a result, even if the output signal CMO from the voltage comparator CMP transits to a low level in a short period of time, staring with transition of the output signal FFO to a high level in the flip flop FF, the high level period of time of the output signal FFO in the flip flop FF is extended if such timing is within the delay time timed at the delay circuit DL, without resetting the flip flop FF. The expansion time period EX in FIG. 7 represents this extended time.

A minimum time while the main switch S1 is maintained in an ON state is ensured in one cycle. Thus, the ON time of the main switch S1 may be extended, promoting power supply to the output terminal VO.

Figure 8:
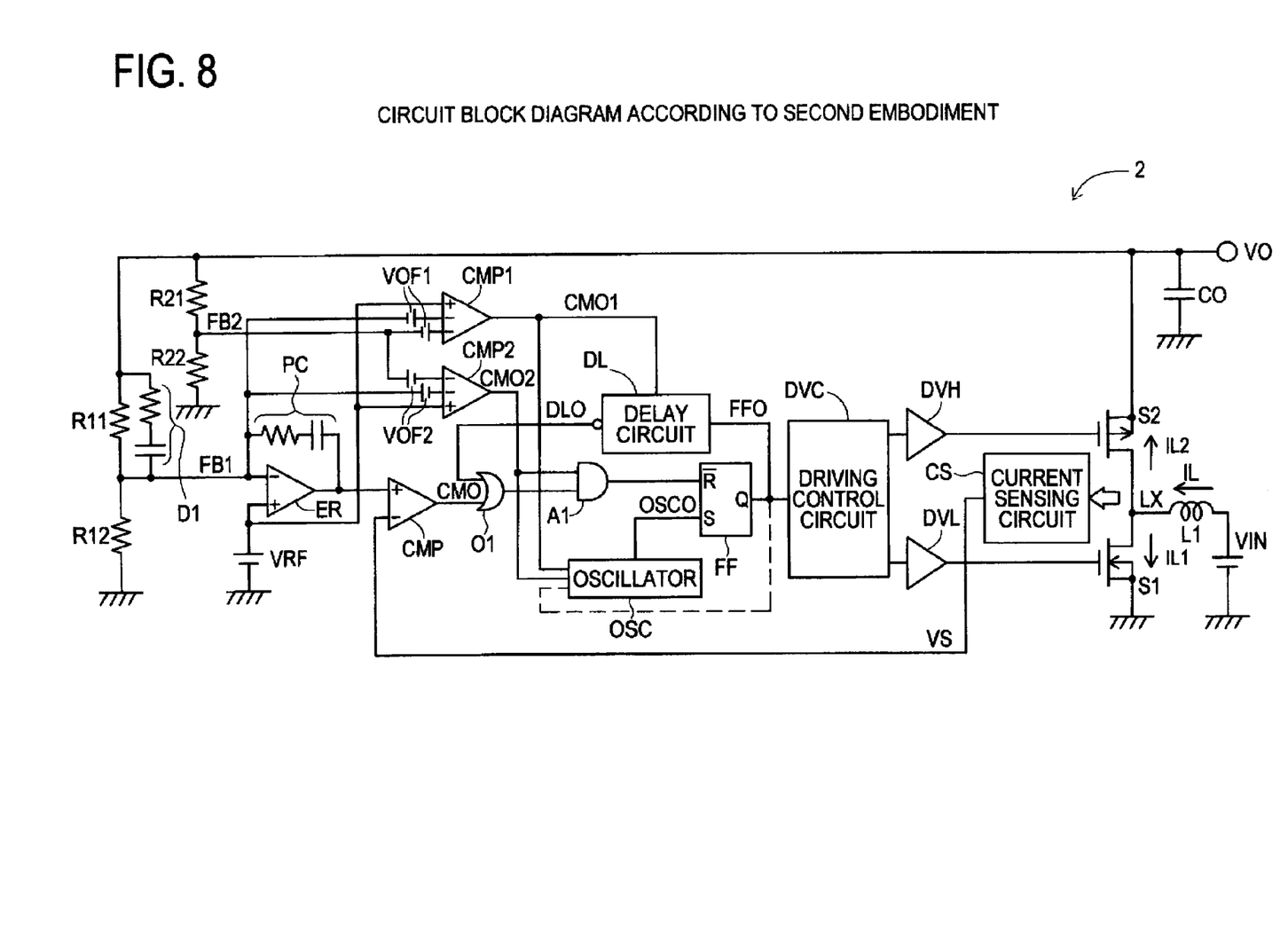
FIG. 8 is a circuit block diagram according to a second embodiment.

The second embodiment will be explained while referring to FIG. 8. FIG. 8 is a circuit block diagram according to the second embodiment. In FIG. 8, the reference numeral 2 represents a step-up DC-DC converter. The circuits illustrated in FIGS. 2, 4 and 6 may be applied to the second embodiment. The constituent elements similar to those of the first embodiment are denoted by the similar reference numerals and an explanation thereof will be omitted here.

Since the DC-DC converter of the second embodiment is of a step-up type, an input voltage VIN, a main switch S1, a synchronous rectifier switch S2, a choke coil L1, an output capacitive element CO and an output terminal VO are connected in different positions from those of the DC-DC converter of a step-down type. In the embodiment of the step-up DC-EC converter, a PMOS transistor is used as the synchronous rectifier switch S2.

An output terminal of a high-side driver DVH is connected to a gate terminal of the synchronous rectifier switch S2. An output terminal of a low-side driver DVL is connected to a gate terminal of the main switch S1. A source terminal of the synchronous rectifier switch S2 is connected to one end of a resistive element R11, one end of a resistive element R21, the output terminal VO and one end of the output capacitive element CO. The other end of the output capacitive element CO is connected to ground.

A source terminal of the main switch S1 is connected to ground. A drain terminal of the main switch S1, a drain terminal of the synchronous rectifier switch S2, and one end of the choke coil L1 are connected to each other. The input voltage VIN is inputted to the other end of the choke coil L1.

There is no difference between the step-up DC-DC converter 2 and the DC-DC converter 1 except for the characteristic difference between step-up type and step-down type. There is also no difference in the operation waveforms between the oscillator of the first circuit example and the oscillator of the second circuit example, which are respectively illustrated in FIG. 3 and FIG. 5. Therefore, an explanation of the operation and effect may be omitted here.

Figure 9:
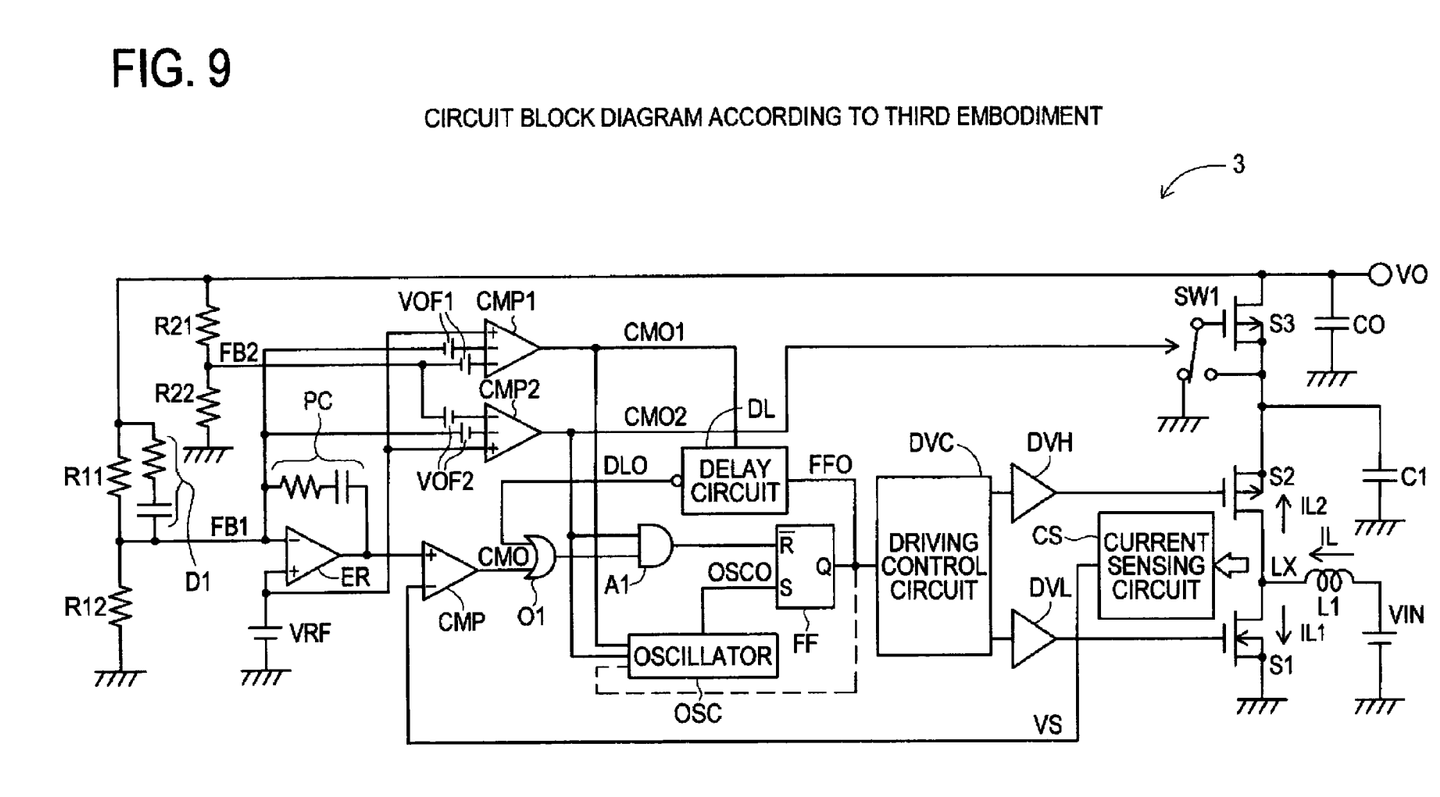
FIG. 9 is a circuit block diagram according to a third embodiment.

The third embodiment will be explained while referring to FIG. 9. FIG. 9 is a circuit block diagram according to the third embodiment. In FIG. 9, the reference numeral 3 represents a DC-DC converter is the step-up DC-DC converter to which an improvement is made (hereinafter referred to as the "improved DC-DC converter"). The constituent elements similar to those of the second embodiment are denoted by the similar reference numerals and thus an explanation thereof may be omitted here. The circuits illustrated in FIGS. 2, 4 and 6 may be also applied to the third embodiment.

In contrast to the second embodiment, a source terminal of a synchronous rectifier switch S2 is not connected to respective one ends of resistive elements R11 and R21, one end of an output capacitive element CO, and an output terminal VO. Instead, the source terminal of the synchronous rectifier switch S2 is connected to one end of a capacitive element C1, a first terminal of a switch element SW1 and a source terminal of a second synchronous rectifier switch S3.

The other end of the capacitive element C1 is connected to ground. A second terminal of the switch element SW1 is connected to ground. A third terminal of the switch element SW1 is connected to a gate terminal of the second synchronous rectifier switch S3. A control terminal of the switch element SW1 is connected to an output terminal of a voltage comparator CMP2.

The switch element SW1 is an element which changes the connection point depending on a logic level to be inputted to the control terminal thereof. When a high level signal is inputted to the control terminal, the switch element SW1 connects the gate terminal of the second synchronous rectifier switch S3 and the ground voltage. When a low level signal is inputted to the control terminal, the switch element SW1 connects the gate terminal of the second synchronous rectifier switch S3 and the source terminal of the synchronous rectifier switch S2.

A drain terminal of the second synchronous rectifier switch S3 is connected to respective one ends of the resistive elements R11 and R21, the output terminal VO and one end of the output capacitive element CO. The other end of the output capacitive element CO is connected to ground. In the third embodiment, a PMOS transistor is used as the second synchronous rectifier switch S3.

Figure 10:
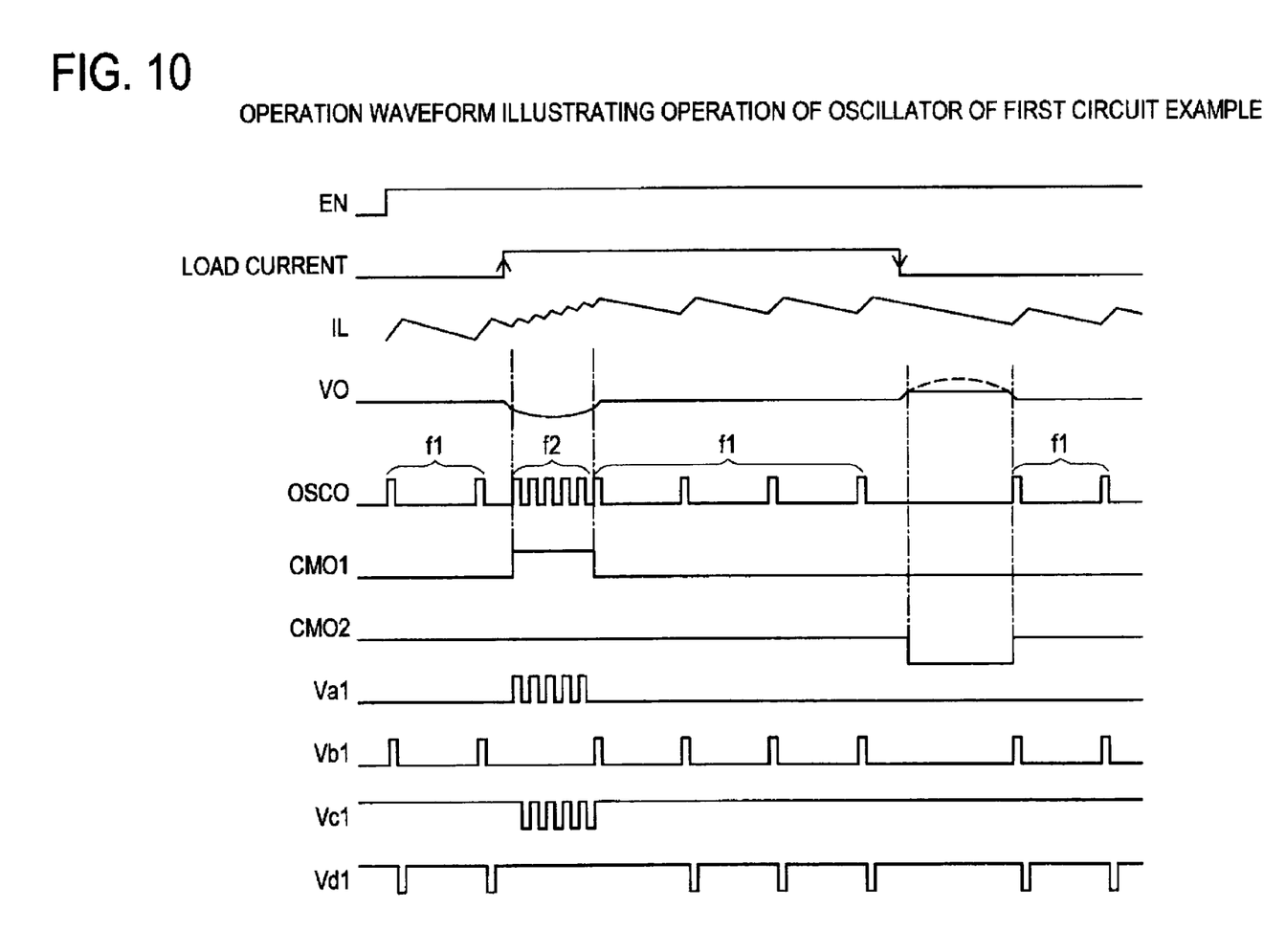
FIG. 10 is an operation waveform diagram illustrating the operation of oscillator as the first circuit example.

Operation and effect of the third embodiment will be explained while referring to FIG. 10. It is to be noted that there will be explained only the operation and effect peculiar to the third embodiment. An explanation on the other operation and effect will be omitted since they are similar to those of the second embodiment.

Here, an explanation will be made in case of a steady state where a load current makes transition from a heavy load to a light load. At this time, an output voltage VO increases transiently. Also, an output terminal CMO2 of the comparator CMP2 outputs a low level signal. In response to an input of a low level signal from the output terminal CMO2 to the control terminal of the switch element SW1, the switch element SW1 connects the gate terminal of the second synchronous rectifier switch S3 and the source terminal of the second synchronous rectifier switch S3. In this manner, the second synchronous rectifier switch S3 turns off. As a result, the source and drain of the switch S3 are blocked off and brought into non-conductive state electrically and thereby an increase of the output voltage VO may be suppressed. The waveform indicated by the dotted line in FIG. 10 represents the output voltage VO of the second embodiment. The wave form indicated by the solid line represents the output voltage VO of the third embodiment.

Here, the voltage comparator CMP, the flip flop FF, the drive control circuit DVC, the high-side driver DVH, the low-side driver DVL, the current sensing circuit CS and a logic gate linking these circuits represent one example of a first control unit. The first oscillating unit 11 and the second oscillating unit 12 in the first circuit example of the oscillator OSC represent one example of a first timing unit. The third oscillating unit 16 in the second circuit example of the oscillator OSC represents one example of a second timing unit. The NAND gate 41, the NOR gate 45, the OR gate 14 and the AND gate 15 in the first circuit example of the oscillator OSC represent one example of a second control unit. Further, the NAND gate 61, the NOR gate 65, the OR gate 14 and the AND gate 15 in the second circuit example of the oscillator OSC represents one example of a second control unit. The delay circuit DL represents one example of a third control unit. The resistive elements R11 and R12 and the differentiating circuit D1 represent one example of a first voltage divider. The resistive elements R21 and R22 represent one example of a second voltage divider. The choke coil L1 represents one example of an inductance element. The differential amplifier ER represents one example of an error amplifier.

As was described earlier in detail, according to the present embodiment, in the first control when the output voltage VO decreases temporarily, it is detected that the output voltage VO decreases to a voltage value obtained as a result in a drop in voltage from the reference voltage VRF by an amount equivalent to the offset voltage or more. The oscillation cycle of the oscillator signal OSCO is thus handled as a short cycle as compared to any prior cycles.

As a result, in a transient state wherein the output voltage VO decreases, a switching operation is carried out in a normal operation, using a short-period oscillator signal OSCO. This may cause an increase in the amount of power to be transmitted to the output voltage VO through the choke coil L1, per unit of time. In a transient state wherein the output voltage VO decreases, power supply to the output voltage VO may be carried out prior to control by the differential amplifier ER. A rapid response may thus be made to a transient decrease in the output voltage VO.

In the first control for the case of a transient decrease in the output voltage VO, it is detected that the output voltage VO has decreased up to a voltage value obtained as a result of a drop in voltage from the reference voltage VRF by an amount equivalent to the offset voltage VOF1 or more. The main switch S1 is thus turned on.

As a result, in a transient state wherein the output voltage VO decreases, the main switch S1 may be turned on in quick response to the transient decrease in the output voltage VO. While the ON timing of the main switch S1 in one cycle is preset in a switching operation in a predetermined cycle, the main switch S1 may be turned on in quick response to the decrease in the output voltage VO, in the case of the second control. Thus, a quick response may be made to the transient decrease in the output voltage VO.

In the third control for the case that the output voltage VO decreases temporarily, it is detected that the output voltage VO has decreased up to a voltage value obtained as a result of a drop in voltage from the reference voltage VRF by an amount equivalent to the offset voltage VOF1 or more. Thus, the minimum ON period (high level period) of the output signal FFO may be extended in the flip flop FF.

As a result, in a transient state wherein the output voltage VO decreases, the ON period of the main switch S1 may be extended, extending, in turn, the power supply time to the choke coil L1. It may be possible to quickly respond to the transient decrease in the output voltage VO.

The embodiment is not limited to the above-described embodiments, but various improvements and alterations may be made thereto within the scope and without departing from the spirit of the embodiment.

For instance, in the present embodiment, it was described that the first through third controls are all applied with respect to the transient decrease in the out put voltage VO. However, each such control may be individually applied as a quick response with respect to the transient decrease in the output voltage VO. A high-speed response may be achieved to control such transient decrease in the output voltage VO by using a combination of all of the first through the third controls, a combination of any two controls of these three controls, or otherwise, any one of such controls, individually.

In the present embodiment, a description was given with respect to a configuration including a differentiating circuit D1 which may be provided only with respect to a voltage divider circuit made up of resistive elements R11 and R12. However, this is not limited to this embodiment. A similar differentiating circuit may also be provided with respect to a differentiating circuit made up of resistive elements R21 and R22.

In the present embodiment, a description was given wherein two sets of voltage divider circuits (a voltage divider circuit made up of resistive elements R11 and R12 and a voltage divider circuit made up of resistive elements R21 and R22) are provided. However, either one of these voltage divider circuits may be provided. There are no particular constraints between the voltage divider circuit connected to the differential amplifier ER and the voltage divider circuit connected to the voltage comparators CMP1 and CMP2. A configuration wherein the voltage divider circuit is shared by the differential amplifier ER and the voltage comparators CMP1 and CMP2 and a configuration wherein the voltage divider circuits are independently provided may be combined as appropriate.

According to the DC/DC converter control circuit and the DC/DC converter control method in the embodiment, the switching operation of the switch element provided in the DC/DC converter is controlled in response to detection of fluctuations in the output voltage of the DC/DC converter in a transient state such as load fluctuations or the like. Thus, power supply to the output terminal may be caused to fluctuate at high speed due to the responsive property of the error amplifier, making it possible to suppress fluctuations in the output voltage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. Numbers applying embodiments (first, second or third etc.) do not show priorities of the embodiments. Many variations and modifications will be apparent to those skilled in the art.

What is claimed is:

1. A DC/DC converter control circuit comprising:
an error amplifier amplifying an error voltage in response to an output voltage and a set voltage determined based on a reference voltage, the output voltage being output from an inductor based on supply of an input voltage to the inductor;
a first controller controlling the output voltage to the set voltage by causing a switching operation of a switch included in a feed path of the input voltage to the inductor, in response to an output of the error amplifier;
an oscillator generating a periodical signal which determines a cycle of the switching operation of the switch; and
a first voltage detector detecting that the output voltage drops from the set voltage by a first voltage value or more;
wherein the oscillator raises a frequency of the periodical signal through shortening a cycle of the periodical signal in response to a detection result of the first voltage detector.

2. The DC/DC converter control circuit according to claim 1, wherein
the oscillator includes a timer timing the cycle of the periodical signal; and
wherein the oscillator shortens a time timed by the timer so that the cycle of the periodical signal is shortened.

3. The DC/DC converter control circuit according to claim 1, wherein
the oscillator includes a timer timing a non-conduction time of the switch; and
wherein the oscillator shortens a time timed by the timer so that the cycle of the periodical signal is shortened.

4. The DC/DC converter control circuit according to claim 1, further comprising a second controller conducting the switch in case that the output voltage drops from the set voltage by the first voltage value or more.

5. The DC/DC converter control circuit according to claim 1, further comprising a second controller which extends a conduction time of the switch in case that the output voltage drops from the set voltage by the first voltage value or more.

6. The DC/DC converter control circuit according to claim 1, wherein the first voltage detector is provided with an offset voltage corresponding to the first voltage value and the output voltage or a voltage based on the output voltage and the reference voltage.

7. The DC/DC converter control circuit according to claim 1, wherein the switch is in a non-conductive state in case that the output voltage increases from the set voltage by a second voltage value or more.

8. The DC/DC converter control circuit according to claim 7, wherein the oscillator stops output of the periodical signal in case that the output voltage increases from the set voltage by the second voltage value or more.

9. The DC/DC converter control circuit according to claim 7, further comprising a second voltage detector detecting that the output voltage increases from the set voltage by the second voltage value or more.

10. The DC/DC converter control circuit according to claim 9, wherein the second voltage detector is provided with an offset voltage corresponding to the second voltage value and the output voltage or a voltage based on the output voltage and the reference voltage.

11. The DC/DC converter control circuit according to claim 1, further comprising:
- a first voltage divider which receives the output voltage and outputs a first divided voltage which is a divided voltage of the output voltage, the first voltage divider comprising a differential circuit differentiating between the output voltage and the first divided voltage;
- wherein the first divided voltage is input to the first voltage detector as a voltage based on the output voltage.

12. The DC/DC converter control circuit according to claim 11, further comprising:
- a second voltage divider which receives the output voltage and outputs a second divided voltage which is a divided voltage of the output voltage; and
- a second voltage detector detecting that the output voltage increases from the set voltage by a second voltage value or more;
- wherein the second divided voltage is input to at least either one of the first and second voltage detectors as a voltage based on the output voltage.

13. The DC/DC converter control circuit according to claim 1, having:
- a first voltage divider which receives the output voltage and outputs a first divided voltage which is a divided voltage of the output voltage, the first voltage divider including a differential circuit differentiating between the output voltage and the first divided voltage;
- a second voltage divider which receives the output voltage and outputs a second divided voltage which is a divided voltage of the output voltage; and
- a second voltage detector detecting that the output voltage increases from the set voltage by a second voltage value or more;
- wherein the first and the second divided voltages are inputted to at least either one of the first and second voltage detectors as a voltage based on the output voltage.

14. A DC/DC converter control circuit comprising:
- an error amplifier amplifying an error voltage between an output voltage and a set voltage determined based on a reference voltage, the output voltage being output from an inductor by supplying input voltage to the inductor in a given cycle which is determined;
- a first controller controlling the output voltage to the set voltage by causing a switching operation of a switch included in a feed path of the input voltage to the inductor, in response to an output of the error amplifier in the given cycle;
- a first voltage detector detecting that the output voltage drops from the set voltage by a first voltage value or more; and
- a second controller extending a conduction time of the switch in response to a detection result of the first voltage detector.

15. A DC/DC converter control method, comprising:
- amplifying an error voltage in response to an output voltage and a set voltage determined based on a reference voltage, the output voltage being output from an inductor based on supply of an input voltage to the inductor;
- controlling the output voltage to the set voltage by causing a switching operation of a switch in response to the error voltage, the switch being included in a feed path of the input voltage to the inductor;
- generating a periodical signal which determines a cycle of the switching operation of the switch; and
- detecting that the output voltage drops from the set voltage by a first voltage value or more;
- wherein a frequency of the periodical signal is raised through shortening a cycle of the periodical signal when the output voltage drops from the set voltage by the first voltage value or more.

16. The DC/DC converter control method according to claim 15, wherein a non-conduction time of the switch is shortened in case that the cycle of the periodical signal is shortened.

17. The DC/DC converter control method according to claim 15, wherein the switch is conductive in case that the output voltage drops from the set voltage by the first voltage value or more.

18. The DC-DC converter control method according to claim 15, wherein a conduction time of the switch is extended in case that the output voltage drops from the set voltage by the first voltage value or more.

* * * * *